Oct. 20, 1925.

C. R. KEEFER 1,558,179

WINDING AND TWISTING MACHINE

Filed Oct. 6, 1924

Inventor,
*C. R. KEEFER.*
By *Sterling P. Buck,*
Attorney.

Oct. 20, 1925.  1,558,179
C. R. KEEFER
WINDING AND TWISTING MACHINE
Filed Oct. 6, 1924  6 Sheets-Sheet 2

Inventor,
C. R. KEEFER.
By Sterling P. Buck,
Attorney.

Oct. 20, 1925.

C. R. KEEFER

WINDING AND TWISTING MACHINE

Filed Oct. 6, 1924 6 Sheets-Sheet 6

1,558,179

Inventor,

C. R. KEEFER.

By Sterling P. Buck,

Attorney.

Patented Oct. 20, 1925.

1,558,179

UNITED STATES PATENT OFFICE.

CHARLES R. KEEFER, OF BALTIMORE, MARYLAND.

WINDING AND TWISTING MACHINE.

Application filed October 6, 1924. Serial No. 742,018.

*To all whom it may concern:*

Be it known that I, CHARLES R. KEEFER, a citizen of the United States, residing at Baltimore city, in the State of Maryland, have invented certain new and useful Improvements in Winding and Twisting Machines, of which the following is a specification.

This invention relates to winding and twisting machines, and especially to an improved form of machine for making chenille and tinsel garlands.

One object of this invention is to greatly simplify the operation of machines of this character and to eliminate the necessity of employing one of the persons who is necessarily employed in operating previously known machines of this character efficiently, thus greatly reducing the cost of operation and the resultant cost of the products of such machines.

Another object is to provide a machine of this character which eliminates the necessity for numerous and variously proportioned interchangeable prongs around which the weft or winding line is wound as the preliminary step in forming the chenille or tinsel garlands.

Another object is to provide a device of this character with a greatly simplified, very quickly and conveniently adjustable device for forming what is known as zig-zag chenille or tinsel garlands.

Another object is to provide an endless double-loop feeding wire or line in lieu of the separate feeding wires employed in previously known machines of this kind, for assisting the weft in its forward movement along the parallel and laterally adjustable prongs or grooved bars around which the weft is wound, thus assuring an equal rate of travel for the feeding parts of the machine.

A further object is to provide a machine of this kind with a simple and improved form of circular knife sharpener mounted in such relation to the knife that it can be quickly and properly brought into the sharpening relation with the knife without interfering with the operation of the machine.

Another object is to provide a machine of this character having tensioning wheels on pivotally mounted arms which have their pivoted axes in fixed relation to the prongs or spaced and grooved bars around which the weft is wound; these tensioning wheels, therefore, being adjustable with said prongs.

Another object is to eliminate waste of the tinsel or weft lines, in operating a machine of this character, by eliminating the rewinding of bobbins such as employed in previously known machines of this character, thus also saving the time required for such rewinding, by providing means to properly carry the spools on which the tinsel or weft-lines are wound by the manufacturers thereof.

Another object is to provide a machine of this character in which the circular knife rotates at a considerably greater speed than that of previously known machines of this character.

Another object is to provide a very simple and effective tensioning adjustment for the endless feed wire.

Other objects and important features will be pointed out or implied in the following details of description, in connection with the accompanying drawings in which:

Fig. 2 is a top plan view of the parts shown in Fig. 1, with the exception of certain members above the bed-plate and others near the bottom of the machine being broken off and omitted, two of the weft-carrying spools being shown, and the positions of the centers of other spools being indicated in broken lines, and designated by the same reference characters as those of the weft-spools;

Figure 4:
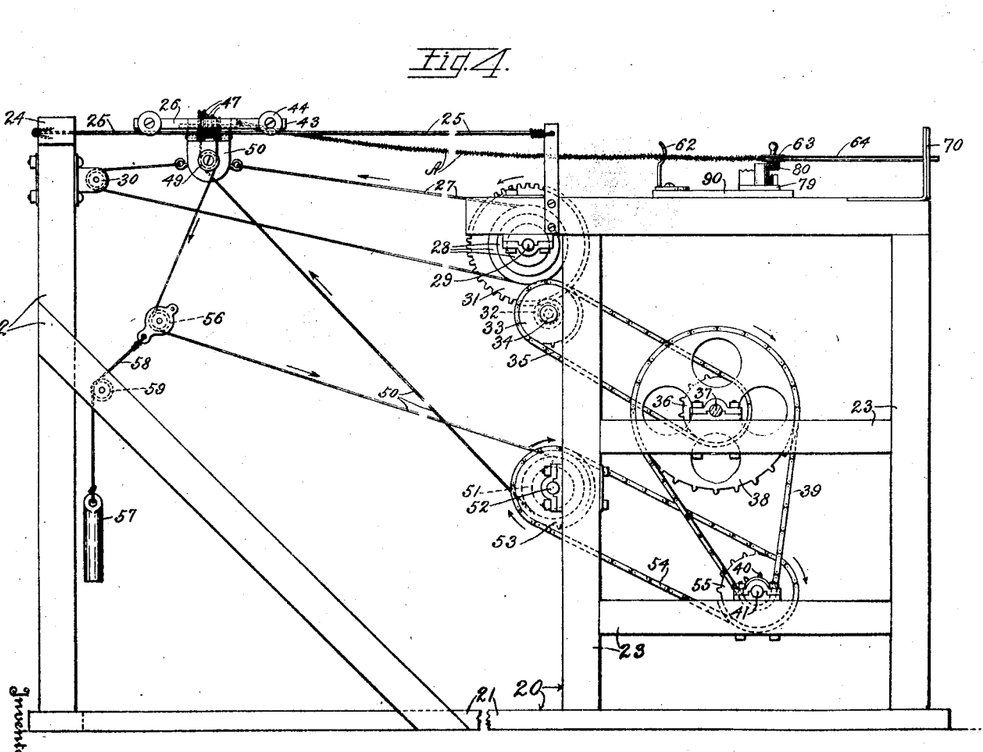
Fig. 4 is a left side view of the entire frame structure with the exception of the part broken out of the lower or base-beams; this view showing also the operating mechanism for the front carriage or spindle-carriage in connection with the main driving shaft, and the correlated guiding elements on the bed-plate.

Referring to these drawings in detail, in which similar reference characters correspond to similar parts throughout the several views, and now referring especially to Figure 4, it will be seen that the main frame 20 includes one or more base beams 21, preferably two of these base beams, as indicated in Fig. 2, and on these base beams are supported the front frame section 22 and the rear frame section 23, the lathe including a pair of front posts and a pair of rear posts, each of these posts including legs which stand upon the base beam. The front frame section may include either one or more uprights or posts supporting a horizontal beam 24 to which is secured two track wires 25 on which the spindle carriage 26 (Figures 4, 5, and 6) is caused to travel by means of a line 27. In this connection, it is explained that the word "line" is intended as a broad term which includes a wire, a cable, a rope, a chain or other similar flexible element employed for transmission or traction. This line 27 has its ends connected to the carriage 26 by any appropriate means, and passes around any one of the group of stepped pulleys indicated at 28, these pulleys being secured on a shaft 29 which is journaled in suitable bearings on the frame section 23. The front end of the line 27 extends around a wheel 30 on the front frame section 22. On the shaft 29 is also carried a spur-gear 31 which meshes with a spur-pinion 32 which is fixedly united with a sprocket-wheel 33, these elements 32 and 33 being journaled on a stud 34 which is secured on the frame section 23 by any appropriate means. A sprocket-chain 35 connects the gear-wheel 33 with a similar gear-wheel or sprocket-wheel 36 which latter is secured on a shaft 37 which is journaled in bearings on the frame 23. The shaft 37 has a relatively large sprocket-wheel 38 secured thereon, which carries a chain 39 connecting it to a relative small sprocket-wheel 40, the latter being secured to the main driving shaft 41 which may be turned by any appropriate means (not shown). From the foregoing description, it will be seen that the train of gearing from 31 to 40, inclusive, causes the shaft 29 and grooved wheels 28 to turn very slowly in comparison to the speed of the shaft 41 and sprocket-wheel 40, thus moving the carriage 26 slowly along the track wires 25, towards the beam 24.

The construction and purpose of the spindle-carriage 26 will now be explained in connection with Figures 5 and 6 of the drawings, as follows:

The main body of the carriage 26 constitutes a frame including two horizontal beams 42 having their ends secured to two other horizontal beams, the latter being indicated at 43; these latter beams have wheels 44 journaled thereon and provided with annular grooves which receive the track-wires 25 on which the carriage 26 travels. A pair of spindles 45 are journaled in suitable bearings on this carriage, and each spindle is provided with a hook 46 to which is secured one end of the strands of lines which are twisted together with the weft or winding lines which have been cut in the process of forming the two separate strings or lines of chenille or tinsel garlands. In other words, these spindles not only twist the strands or lines which form the center of each string of chenille or tinsel garland, but also pull these central strands or lines, thereby feeding the work forward while the weft lines are being wound thereon. Each spindle 45 is provided with a grooved pulley, preferably a step-pulley, as shown at 47. The carriage is also provided with grooved guide pulleys 48 and 49 which are suitably journaled on the spindle carriage for changing the direction of motion of a belt or endless line 50 which passes about these guide-pulleys, about the step-pulleys 47, and about a driving pulley 51 which is carried by a shaft 52 on the frame 23. This shaft is rotated by means of a sprocket-wheel 53, a chain 54 and a sprocket-wheel 55, the latter being on and rotatable with the main driving shaft 41. It should be understood that the step-pulley 51 and sprocket-wheel 53 are secured on and rotatable with the shaft 52. The belt or endless line 50 is provided with a tightening pulley 56 and a weight 57, the latter being attached to the pulley 56 by a line 58 passing about a guide pulley 59 which is journaled on the front part of the main frame and causes the line 58 to pull the tightening pulley 56 forward and downward, thus taking up slack of the belt 50 and causing this belt to hug the pulleys 47 and 51 sufficiently for driving the spindles 46.

The central depending part 60, of the spindle carriage, on which the guide pulleys 49 are journaled, is provided with eyes 61 or other anchoring means to which the ends of the line 27 are secured.

Having described the mechanism by which the central threads or lines of the chenille or tinsel garland are twisted and carried forward, it is now explained that the reference character A represents the product or goods being made by this machine, and that such goods may be either chenille or tinsel garland, according to the character of the elements or lines composing the same. In Figure 4 is shown only one strand or string of such chenille or tinsel garland, the other strand or string being hidden behind the one here shown. In Figure 4 is also shown one of the two spreading guides 62, one of the two tensioning wheels 63, and one of the longitudinally grooved parallel bars or prongs 64, these three elements being most intimately correlated with the tinsel garland or chenille at and adjacent to the point where its formation begins.

Figure 1:
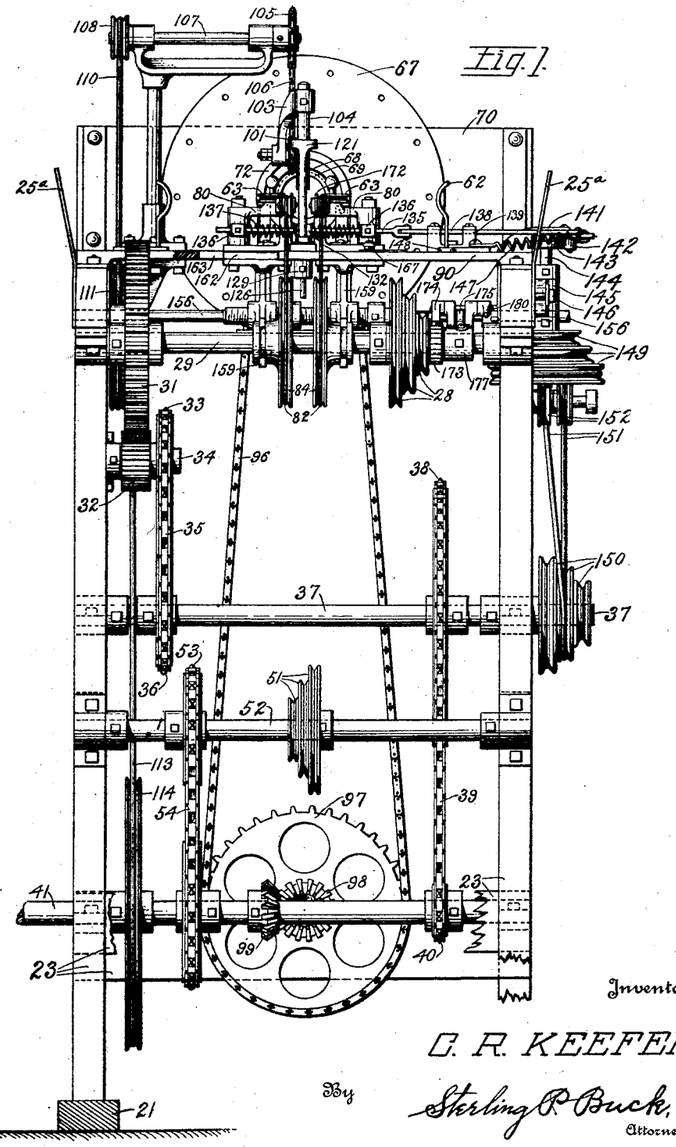
Fig. 1 is a front elevation of the machine, parts of the frame being broken away, and the spool holders, knife sharpener, front carriage, and the carriage-operating and supporting members, being omitted.
Figure 3:
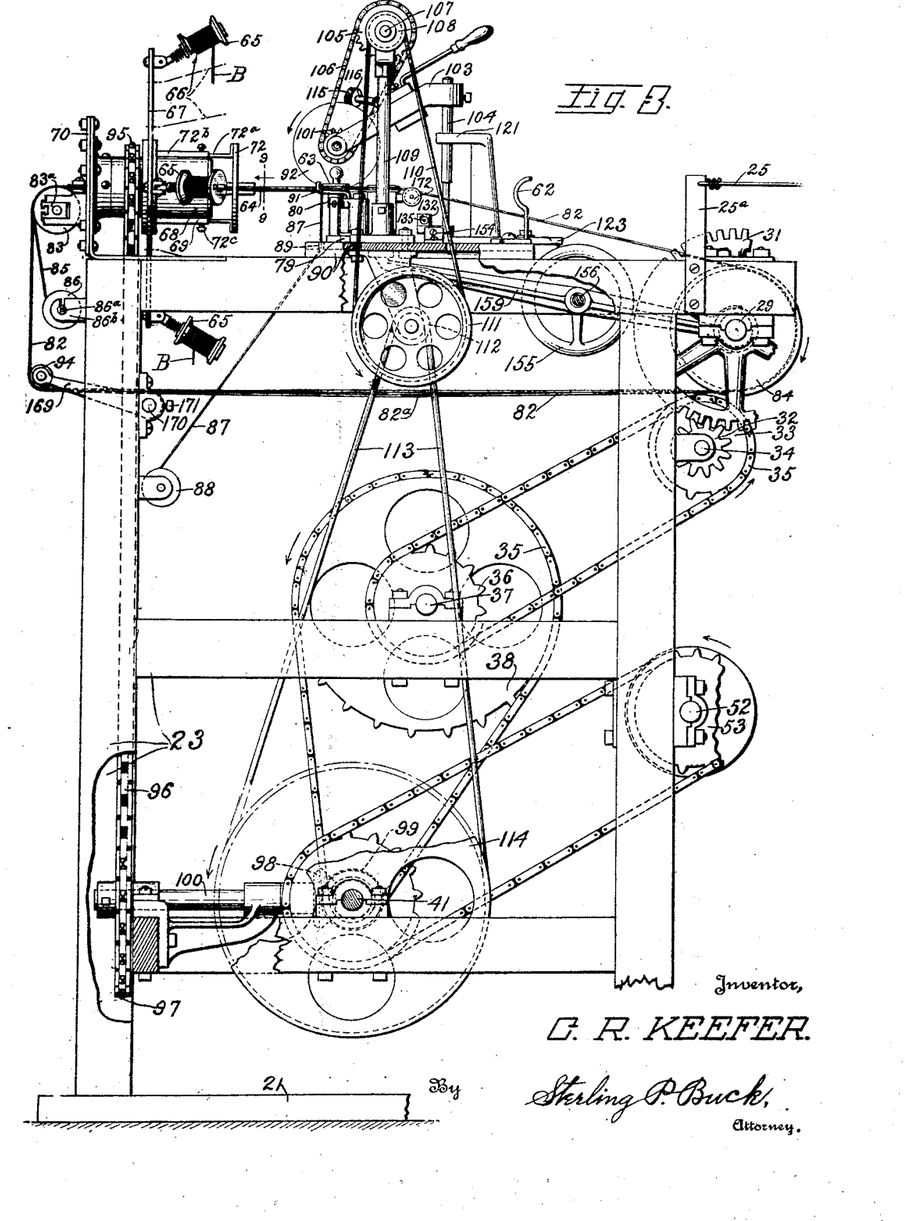
Fig. 3 is a right side view of the parts shown in Fig. 1, parts of the frame being broken away, also having parts of certain wheels broken away to more clearly show the parts which are beyond such wheels, certain parts under the bed-plate being omitted.
Figures 5, 6, 7, 8:
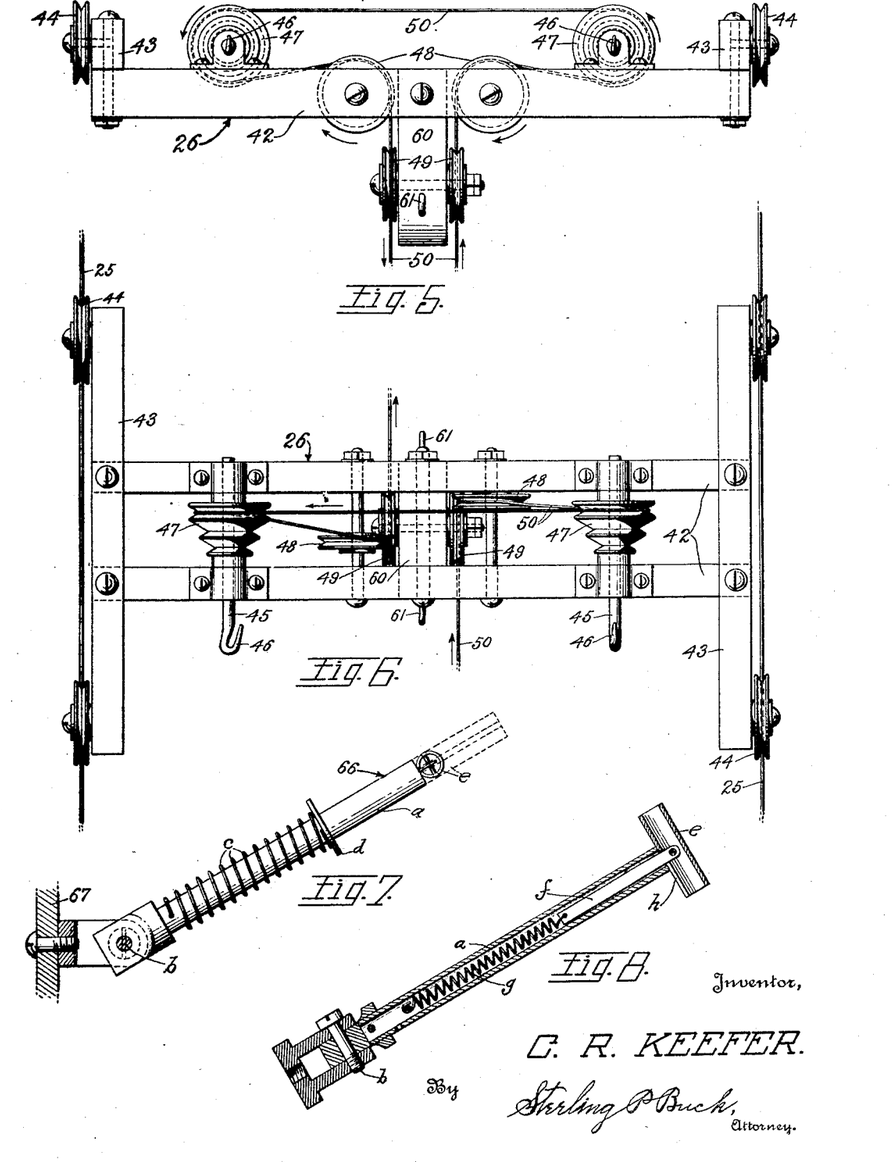
Fig. 5 is a rear elevation of the spindle-carriage and a portion of the endless wire or band which operates the spindles on this carriage.
Fig. 6 is a top plan view of the structure shown in Fig. 5 and the track-wires on which the spindle-carriage travels.
Fig. 7 is a detail view of one of the weft-spool carriers, the spool-retaining element being shown in broken lines in position for permitting removal and replacement of spools.
Fig. 8 is a longitudinal sectional view through one of the spool holders, the tensioning spring and washer being omitted.
Figures 8, 9, 10:
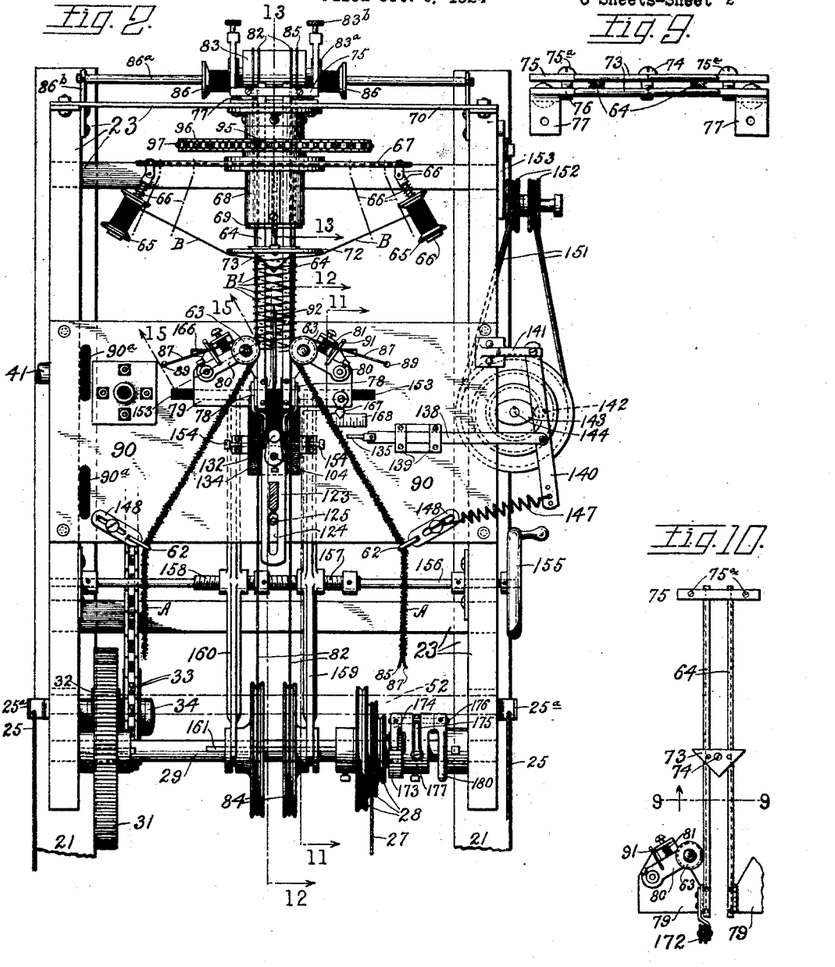
Fig. 9 is an enlarged sectional detail view taken along the line 9—9 of Figs. 3 and 10.
Fig. 10 is a top plan view of the laterally adjustable prongs or spaced bars around which the weft is wound, and the immediate adjuncts of such beams.
Figure 13:
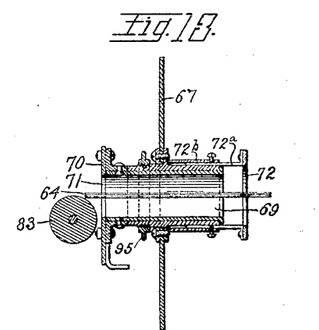
Fig. 13 is a sectional view along the line 13—13 of Fig. 2, the weft-spool-holders being omitted.

Now, referring especially to Figures 1, 2 and 3, and most especially to Figure 2, and again calling attention to the parts 62, 63 and 64, it will be seen that the weft lines or tinsel, indicated at B, are carried on any number of the spools 65, on spool-carriers 66 such as shown in Figures 6 and 7. These spool-carriers will presently be described in detail. They are secured on a disk or rotary plate 67 which has its hub 68 rotatably mounted on a hollow journal 69, this journal being supported on a plate 70 which forms an upward extension of the frame 23 and has an opening 71 (see Figure 13) which communicates with the hollow of the journal 69. The grooved bars or prongs 64 extend through this hollow, and through a ring 72 which serves to guide the weft B onto the bars or prongs 64 as the disk 67 rotates and carries the spools 66 around these bars or prongs 64. A pair of triangular plates 73 (Figures 2, 9 and 10) are clamped on the grooved bars 64 by means of one or more screws 74 which extend through these triangular plates. The lower one of these plates guides and forwardly propels the weft lines as they pass under the bars 64, and the upper one similarly guides the weft lines as they pass over such bars. The bars 64 have their rear ends clamped between upper and lower cross bars 75 and 76 (Figs. 2, 9 and 10), and the lower one of these bars is secured to the rear part of the plate 70 by means of supporting angle plates 77 which may be riveted to such plate 70. The front ends of the bars 64 are supported by upright portions 78 of a pair of laterally adjustable units or carriages 79 on which the tensioning wheels 63 are supported through the medium of pivotally mounted arms 80. The tensioning arms are provided with springs 81 which constantly press them towards the bars 64, so that the wheels 63 have their grooves in open communication with the grooves of the bars 64. As seen in Figure 9, these latter grooves are in the outer edges of the bars 64, and they receive an endless feeding wire 82 (Figs. 2 and 3) which extends around a roller 83 and around a pair of grooved wheels 84, the top parts of this endless wire being parallel (Figure 2), and the lower parts thereof crossing one another at $82^a$ (Figure 3). The wheels 84 (Fig. 3) are rotated in the direction of the arrow, thereby carrying these top parts of the wire 82 forward, thereby feeding the winding $B^1$ of the weft lines forward at equal speeds along the bars 64. The windings $B^1$ also extend around the base strands or lines each of which constitutes one of the core elements or base elements of one of the string of chenille or tinsel garland, these base strands being indicated at 85. They are unwound from spools 86, pass over the roller 83, through the hollow journal 69 (Figs. 2 and 13), along the bars 64, and are each twisted together with threads or lines 87 (Figs. 2 and 3), which latter are unwound from spools 88, extend through openings 89 in a bed-plate 90, thence extend over guiding arms 91 to and around the grooved tensioning or presser wheels 63.

Figure 12:
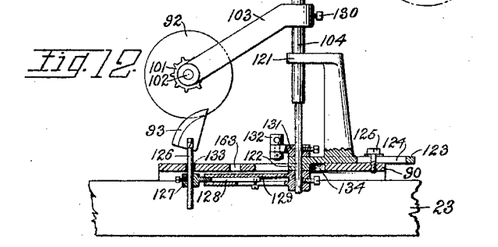
Fig. 12 is a sectional view along line 12—12 of Fig. 2, showing the adjustable construction of the knife-holding and knife-operating mechanism.

The lower edge of the circular knife 92 (Figs. 2, 3 and 12) extends between the bars 64 at a point between the wheels 63, and is cooperative with an upwardly extending lower knife 93 (Fig. 12) for cutting the windings $B^1$ (Fig. 2) at this point where the strands 85 and 87 begin to twist about one another, in consequence of their connections with the spindles 46 which are described in connection with Figures 4, 5 and 6. It will be seen that these twisted strands embrace between them the lengths of weft thread or line which are formed by the cut windings B¹, and it will also be seen that the guides 62 cause the twisted strands to diverge from the feeding wire 82 and leave the latter free to continue its forward movement around the wheels 84, back under the bed-plate 90 and under a guiding roller 94, thence up over the roller 83, and thence forward as previously described. Such feeding wire 82 causes the windings B¹ to move forward along the grooved bars 64, at a speed that can not be other than equal for both loops of this wire thereby assisting the carriage 26 in feeding the chenille or tinsel garlands forward. From the foregoing, it will be seen that this machine forms two strings of tinsel garlands or chenille simultaneously, and that such product of the machine is formed of the lines B and the strands 85 and 87; or in other words, each string of such product in formed of one-half of the windings B¹ twisted in between the strand 85 and the strand 87 at one side of the knife 92.

The disk 67 is on the same hub 68 with the sprocket-wheel 95 which carries a chain 96 that extends down to the sprocket-wheel 97. This latter sprocket is united with a gear wheel 98 (Fig. 1), preferably a bevel-gear, which meshes with a similar gear 99 on the main driving shaft 41. The gear-wheel 98 and sprocket-wheel 97 are united with a shaft 100 which is journaled in suitable bearings on the lower part of the main frame 23. It will be seen, therefore, that the spools 66 are carried around by means of the train of gearing 95, 96, 97, 98, and 99, through the medium of the shafts 41 and 100.

The wheels 84, which carry the endless wire 82, are feather-keyed on the shaft 29 which is journaled on the front part of the frame 23. The spur gear 31 drives said shaft, as previously described.

The knife 92 is provided with a sprocket-wheel 101 which rotates therewith, the axis of these elements 102 and 101 being on an arm 103 which is supported on an axle 104 which has rotary movement for a purpose presently explained. The sprocket-wheel 101 is connected to a larger sprocket-wheel 105 by means of a driving chain 106. The sprocket-wheel 105 is mounted on a shaft 107 which carries a grooved pulley 108. The shaft 107 is rotatable in bearings on a standard 109 which is supported on the bed-plate 90 and is secured by bolts or other appropriate means. The wheel 108 is operated by the main shaft 41, through the medium of a belt 110, a relatively large intermediate pulley 111, a relatively small intermediate pulley 112, a belt 113 and a large driving pulley 114, the latter being secured on and rotatable with the shaft 41. By this train of transmission gearing, it will be seen that the knife 92 is driven at a very high rate of speed in comparison to that of the main driving shaft.

Figure 14:
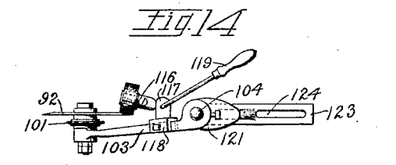
Fig. 14 is a top plan view of the circular knife, the knife-sharpener, and the adjustable support for the knife and knife-holder.
Figure 15:
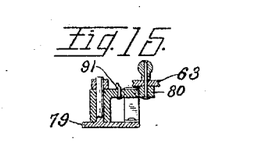
Fig. 15 is a sectional view along the line 15—15 of Fig. 2.
Figure 16:
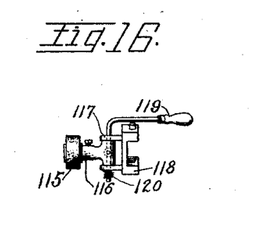
Fig. 16 is a front elevation view of the adjustable knife-sharpener detached, and its sharpening wheel out of the sharpening position shown in Fig. 14.

The knife 92 may be sharpened at any time during operation of the machine, while said knife is rotating by means of an abrasive wheel 115 rotatably mounted on an arm 116 (Figures 3, 14 and 16), said arm being pivotally mounted in bearings 117 of a clamp 118. A handle 119 extends radially from the pivot or axle of the arm 116, and a spring 120 connects with said pivot or axle and with one of the bearings 117 for yieldingly holding the abrasive wheel 115 out of contact with the knife 92. When it is desired to sharpen the knife, the operator swings the handle 119 in the direction for moving the abrasive wheel against the knife 92, or into the position shown in Figure 14. The axle 104 is journaled in bearings 121 and 122 of an adjustable unit, preferably the casting which also includes a forward extension 123 having a slot 124 therethrough, and a screw 125 extends through this slot into the bed-plate 90. By loosening this screw, the said unit may be moved forward or rearward for adjusting the knife 92 horizontally, such adjustment being desirable in consequence of the decreasing size of the knife as it becomes ground away in the operation of sharpening. The adjustment of this unit also tends to move the knife 92 forward or backward, and this latter knife is individually adjustable as follows:

The knife 93 is supported by a vertical rod 126 which is vertically adjustable in a bearing 127 provided with a screw to hold it in its different adjustments. The bearing 127 is united with a rod 128 which extends forward into a bearing 129 which is provided with a screw for holding the bearing 127 in its different adjustments. The bearing 129 is secured on the lower end of the vertical shaft 104, as shown, or by any appropriate means. The knife 92 is also vertically adjustable on the shaft 104 by loosening the screw 130, and tightening such screw after moving the arm 103 up or down.

For the purpose of swinging the knives 92 and 93 laterally of the grooved bars 64, the shaft 104 is provided with an arm 131 having pivoted thereto an apertured element 132 which connects with an operating mechanism which will presently be described in connection with the operation of forming zig-zag products viz, chenille or tinsel garland. The bed-plate 90 is provided with a slot 133 in which the rod 126 moves laterally. It will also be seen that the bed plate has a slot or opening 134 therethrough, through which the shaft 104 and its lower bearing extends.

Referring now to Figures 1, 2 and 3, it will be seen that the apertured element 132 (referred to in the preceding paragraph) receives a rod 135 having collars 136 thereon, also surrounded by springs 137, one of such springs on each side of the member 132, their outer ends pressing against the collars 136, thus holding the rod 135 in yielding relation to the member 132. The rod 135 has a rod 138 pivoted thereto, and this rod 138 is slidable in bearings 139 on the bed-plate. The rod 138 is also pivoted to a lever 140, this lever being pivotally mounted on a bearing 141 on the frame 23. The lever 140 is provided with a stud or roller 142 against which a cam 143 rotates, this cam being carried by a shaft 144 having a vertical axis and being adjustably mounted on the frame 23, that is, mounted in an adjustable bearing 145, the adjustment of this bearing being forward and rearward. A spring 147 is secured to the lever 140 and to a screw which holds an adjustable element 148 on which one of the guides 62 is supported. This spring pulls the lever 140 inward after each time it is pushed outward by the cam 143.

The shaft 144 carries a pulley 149, preferably a step-pulley having a grooved periphery, and this pulley is connected to a step-pulley 150 by means of a belt 151, this belt being guided by a pair of guide-pulleys 152 which are supported on an adjustably mounted bracket 153, the adjustment of this bracket being such as to compensate for the different positions of the belt 151 on the different units of each guide-pulley 149 and 150. The step-pulley 150 is mounted on the shaft 37, so that it is driven by the main shaft, through the medium of gearing which has previously been described. By means of this zig-zag mechanism, just previously described, it will be seen that the knives will be constantly reciprocated laterally when the belt 151 is on during operation of the machine, so that such knives will cut the weft B¹ alternately short and long at opposite sides of the longitudinal center of the machine, thus giving to the chenille or tinsel garland the scolloped appearance. When it is desired to make the chenille or tinsel garland even instead of scolloped, the belt 151 is removed from the pulley 149, and the member 132 is secured in its central position by means of screws 154 (Fig. 2) which abut against the opposite side of this member 132, but which are unscrewed when the zig-zag mechanism is to be operated. These screws serve to limit the swing of the arm 131, according to their adjustment towards and from this arm. The springs 137 are compressed for permitting the rod 135 to reciprocate the same distance at every stroke thereof, regardless of the various adjustments of the screws 154.

Figure 11:
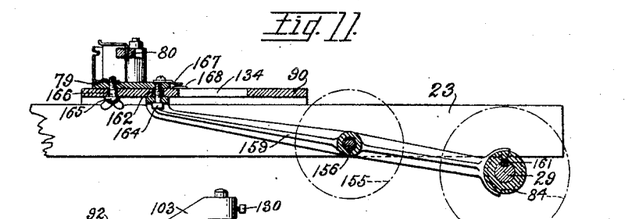
Fig. 11 is a sectional view along the line 11—11 of Fig. 2, the locations of certain wheels being indicated by broken lines.

For the purpose of varying the cross section of the chenille or tinsel garland, an adjusting mechanism is provided for moving the grooved bars 64 toward and from one another, thereby varying the length of the turns or windings B¹, and accordingly varying the lengths of the cut sections of the weft lines. Such adjusting mechanism also includes means for varying the distance between the grooved wheels 84 and the endless wire 82 carried thereby. Such mechanism is best shown in Figures 1, 2, 3 and 11, while Figs. 9 and 10 show separately the bars 64 and the means for holding them in their adjusted positions. The prime mover or handle of such adjusting mechanism is indicated at 155, being secured on a shaft 156 provided with right-hand screw threads 157 and left-hand screw-threads 158. The screw threads 157 and 158 mesh with internal threads of two adjusting bars 159 and 160, respectively, having their front ends fitted into annular grooves of the hubs of the wheels 84. These wheels are feather-keyed on the shaft 29 by means of a key 161, so they can slide axially on the shaft while being rotated thereby. Collars or other appropriate stops may be provided on the shaft 156 to prevent undue strain on the levers 159 and 160 by any effort to move the wheels 84 or the carriers or carriages 79 beyond their limits of travel. Referring to Figure 11, it will be seen that each carriage 79 is formed with a rib 162 which is slidingly fitted in a slot 163 of the bed-plate 90, these being alined slots which communicate with the central opening 134 through which the vertical shaft 104 extends. A screw 164 extends through an opening in one end of each adjusting bar 159 and 160, and is threaded into the rib 162 of the carriage 79 to which it is secured for effecting the lateral adjustment of such carriage. Each carriage 79 is provided with a thumb screw 165 which extends through a slot 166 and is adapted to be tightened for securing its carriage 79 in the adjusted position. One of the carriages 79 is provided with an index finger 167, and the bed-plate 90 is provided with an index scale 168, whereby the operator can gage the distance between the bars 64. Before adjusting the bars 64, of course the screws 74 and 75ᵃ must be loosened, also the thumb-screws 165 of the respective carriages 79, and the thumb-screws 83ᵇ should be turned so as to cause wire 82 to become slack; and now, by turning the handle 155 clockwise, the adjusting bars 159 and 160 are caused to move away from one another, and this widens the distance between the bars 64; and obviously, when it is desired to lessen the distance between the bars 64, the wheel 155 is turned contra-clockwise; and the screws 74, 75ª, 83ᵇ and 165 must now be tightened for securing the adjusted parts in position. The roller 94 is mounted on an arm 169 which is adjustably mounted on a shaft or stud 170, and held in its position by means of a set screw 171.

Each carriage 79 is provided with a grooved guide-wheel 172 over which the top parts of the endless wires 82 travel. These wheels cooperating with the wheels 63 for holding the endless wire 82 in the grooves of the bars 64.

Referring again to the track wires 25, it will be seen that a pair of uprights or standards 25ª support the rear ends of such track wires. In order that the carriage 26 may be returned to its starting point on the wires 25, without reversing the motion of the gearing of the machine, a ratchet-wheel 173 is secured on the step-wheel or pulley 28, and these united members 26 and 173 are rotatably mounted on the shaft 29 when the ratchet-wheel is out of engagement with a pawl 174. This pawl is yieldingly held in engagement with the ratchet wheel by means of a spring 175 which may press against a flat side of a pintle 176 on which the pawl 174 is secured. This pintle and the spring 175 are carried by a member 177 which is secured on the shaft 29, and the pintle is provided with a handle 180 by which it may be turned for disengaging the pawl from the ratchet 173. When the ratchet is thus disengaged, the step-pulley 28 rotates freely on the shaft 29 while returning the carriage.

The bed-plate 90 is provided with openings 90ª through which the belt 110 passes.

The spools 86 may be carried on a removable shaft 86ª, in brackets 86ᵇ, or these and the spools 88 may be carried by any other appropriate supporting means.

The roller 83 is adjustably mounted in forwardly and rearwardly slidable bearings 83ª, and adjusting screws 83ᵇ may be turned for effecting adjustment of this roller.

The guide-ring 72 is supported by parallel arms 72ª which are slidable in tubular elements 72ᵇ, for effecting adjustment of the guide-ring, screws 72ᶜ being provided to secure the guide-ring in its adjustments.

Each spool holder 66 is preferably of the form shown in Figs. 7 and 8, and includes a tubular journal *a*, a pivotal joint *b*, a spool-tensioning spring *c* and washer *d*, and an adjustable spool-securing end *e*, the latter being held in its spool-securing position by a flat link *f* and a contractile spring *g*. One end of the spring is secured in the tubular journal by any appropriate means, and its other end is secured to the link *f*. The other end of the link *f* is pivoted in the tubular member *e*, and a slot *h* is provided so the part *e* can be swung into the broken line position of Fig. 7 after it has been pulled out sufficiently against the resistance of the spring *c*. When in the broken line position, it permits the spools to be passed thereover and onto the journal *a*, and when the spool is placed on the journal *a*, the part *e* is then to be swung into the full-line position, of Fig. 8, for holding the spool against pressure of the spring *c*. The part *a* is angularly adjustable at the joint *b*.

It is not intended to limit this invention to the exact details of construction and arrangement here shown, but changes may be made within the scope of the inventive ideas as implied and claimed.

What I claim as my invention is:

1. A machine of the character described including parallel bars, means to wind lines around these parallel bars, means to feed the wound lines along the parallel bars, means to cut the lines between the parallel bars, means to carry pairs of strands into positions for receiving sections of said lines between these strands of each pair, means to twist the strands of each pair with said cut lines therebetween, means to carry the twisted strands forward, and means to adjust the said parallel bars towards and from one another for the purpose specified.

2. The structure defined by claim 1, the second said means including a rotary element provided with a plurality of spool holders, each spool holder being provided with means to yieldingly resist unwinding movement of the spool held thereby.

3. The structure defined by claim 1, the last said means including a rotary member having right-hand and left-hand screws, and means meshing with said screws and connected respectively with said parallel bars in the relation for effecting the adjustment of the latter.

4. The structure defined by claim 1, the last said means including an adjusting shaft provided with right-hand and left-hand screws, adjusting means having internal threads meshing with said screws, and means connecting the adjusting bar respectively with said parallel bar in the relation for effecting the lateral adjustment of said parallel bars.

5. The structure defined by claim 1, carriages with which the respective parallel bars are united, tensioning wheels, and means on the said carriages for holding said tensioning wheels yieldingly against said parallel bars, the last said means including movable connections with said carriage, these connections being such that the said tensioning wheels retain their respective relations with the parallel bars during the adjusting operation of the latter.

6. The structure defined by claim 1, carriages on which said parallel bars are rigidly secured, and means to guide these carriages in a straight line towards and from one another, whereby said parallel bars are moved toward and from one another while being held by the carriages in the parallel relation.

7. The structure defined by claim 1, each of said parallel bars being longitudinally grooved, said means to feed the wound threads being driven forward in these grooves of the parallel bars, carriages on which these bars are rigidly secured, means to guide the carriages in a straight line from one another and thus hold these bars parallel in all of their adjusted positions, means on the carriage for guiding the feeding means after the latter passes forward from the parallel bars, and spring-pressed means on the carriages for yieldingly holding said feeding means in the longitudinal groove.

8. The structure defined by claim 1, the said means to feed the wound thread including a rotary shaft, grooved wheels feather-keyed thereon and rotatable therewith, sections of wire in the grooves of said wheels and movable forward thereby, these sections of wire being against the outer edges of said parallel bars, and means co-operative with the last said means of claim 1 for adjusting said grooved wheels axially of said rotary shaft and thereby adjusting said wire sections in accordance with the adjustments of said parallel bars.

9. In a machine of the character described, the combination of two laterally adjustable bars, means to guide two strands along these bars, means to wind lines around these bars and strands, means to guide other strands into position to be twisted with the first said strands respectively and to receive said lines therebetween, means to sever said lines between said laterally adjustable bars, and means to hold said bars in their different adjusted positions.

10. In a machine of the character described, the combination of means to hold two strands in spaced relation, means to move said strands longitudinally, means to guide two other strands into position to be twisted respectively with the first said strands, means to twist the pairs of strands thus brought into twisting relation, means to wind lines around the first said strands, this latter means including spools and spool holders, said spool holders being angularly adjustable with respect to the first said strands, means to co-operate with the first said strands for urging the wound lines forward so the latter are brought between the twisting strands, and means to sever the wound lines.

11. In a machine of the character described, the combination of separate bars to hold strands in spaced relation, means to adjust the first said means and thereby vary the distance between the strands, means to guide two other strands into position to be twisted with the first said strands respectively, means to wind lines around the first said strands where they are spaced by the first said means, means to move the wound lines into position to be embraced between the twisting strands, means to sever the wound lines and thus divide them into two series of line-sections and apportion such two series to the two pairs of twisting strands, and means to propel the twisting pairs of strands for the purposes specified.

12. The structure defined by claim 11, the second said means including a rotary member having right-hand and left-hand screws, the first said means including two bars movable laterally towards and from one another, and means connecting said bars with said screws respectively, whereby the rotation of said rotary member effects the lateral adjustment of said bar and of the strands held thereby.

13. The structure defined by claim 11, the first said means including spaced bars, the severing means being between said bars and movable towards and from the respective bars alternately, and means to effect the alternate movements of the severing means, whereby the wound lines are severed at various distances from the said bars, for the purpose specified.

14. The structure defined by claim 11, the first said means including spaced bars, said severing means including a rotary knife, and another knife which overlaps the rotary knife at a point between said bars, so that these knives have their edges in the relation of a pair of shears.

15. The structure defined by claim 11, the first said means including spaced bars, said severing means including a rotary knife, another knife which overlaps the rotary knife at a point between said bars, so that these knives have their edges in the relation of a pair of shears, and means to move these knives towards and from the respective bars alternately, whereby the wound lines are severed at various distances from the said bars, for the purposes specified.

16. In a machine of the character described, the combination of means to hold strands in spaced relation, means to wind lines around said strands, means to guide other strands into twisting relation with the first said strands respectively, means to twist pairs of said strands together, means to propel the twisting strands and the wound lines and thus cause the latter to be embraced between the twisting strands, a knife for severing the wound lines, an oscillatory support on which the knife is mounted, means to oscillate the support and thereby oscillate the knife for varying the lengths of the parts cut from the wound lines, and means on said oscillatory support and movable therewith and with said knife and operable to sharpen the knife while the latter oscillates.

17. In a machine of the kind described, the combination of means to hold two strands spaced from one another, means to wind lines around the strands spaced thereby, means to guide other lines into position to be twisted with the first said lines respectively, propelling means to move the wound lines between the twisting lines, means to sever the wound lines, said propelling means including an endless line crossing itself and forming loops for the respective first mentioned strands, and driving wheels around which these loops have frictional engagement, each of these loops frictionally engaging one of the first said strands for assisting in propelling the wound lines.

18. The combination of means to hold two strands spaced from a given plane, means to wind lines around these strands, a knife, a device to carry the knife from one side to the other side of said plane for cutting the wound lines into various lengths, means to secure the cut lines to said strands, a mechanism for actuating said device, and adjustable means for stopping said device at various positions, said mechanism including a reciprocatory rod yieldingly connected to said device, a lever, a cam-mechanism to swing said lever, and means for connecting said lever to said reciprocatory rod.

19. A machine of the character described including parallel bars, means to wind lines around these parallel bars, means to feed the wound lines along the parallel bars, means extending between these bars for cutting the wound lines, means to carry pairs of strands into position for receiving sections of said lines between these strands of each pair, means for twisting these strands with said cut threads therebetween, and means to carry the twisted strands forward.

In testimony whereof I affix my signature.

CHARLES R. KEEFER.